United States Patent
Mochizuki et al.

(10) Patent No.: US 11,820,413 B2
(45) Date of Patent: Nov. 21, 2023

(54) MOVING BODY

(71) Applicant: Nippon Telegraph and Telephone Corporation, Tokyo (JP)

(72) Inventors: Shoji Mochizuki, Musashino (JP); Masayuki Tsuda, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 231 days.

(21) Appl. No.: 17/608,844

(22) PCT Filed: May 27, 2019

(86) PCT No.: PCT/JP2019/020872
§ 371 (c)(1),
(2) Date: Nov. 4, 2021

(87) PCT Pub. No.: WO2020/240652
PCT Pub. Date: Dec. 3, 2020

(65) Prior Publication Data
US 2022/0306174 A1    Sep. 29, 2022

(51) Int. Cl.
*B62B 3/14*    (2006.01)

(52) U.S. Cl.
CPC ................. *B62B 3/1492* (2013.01)

(58) Field of Classification Search
CPC ......... B62B 3/1492; B62B 3/001; B62B 3/00; B62B 3/008; B62B 3/12; B62B 2301/02; B62B 2301/06; B62B 2301/00; B62B 5/04; B60B 19/003; B60B 19/14; B60B 19/00; B60B 2200/43
See application file for complete search history.

(56) References Cited

U.S. PATENT DOCUMENTS

| | | | | |
|---|---|---|---|---|
| 3,465,843 A | * | 9/1969 | Guinot ................. | B62D 15/00 37/417 |
| 4,324,414 A | * | 4/1982 | Wilkes ................. | A61G 5/006 180/7.1 |
| 5,374,879 A | * | 12/1994 | Pin ....................... | G05D 1/0272 180/21 |
| 5,927,423 A | * | 7/1999 | Wada ................... | B60B 35/1072 180/209 |

(Continued)

OTHER PUBLICATIONS

Daisuke Chugo et al., *Development of a Control System for an Omni-Directional Vehicle with Step-Climbing Ability*, Advanced Robotics, vol. 19, No. 1, 2005, pp. 55-71.

(Continued)

*Primary Examiner* — James M Dolak
(74) *Attorney, Agent, or Firm* — Workman Nydegger

(57) ABSTRACT

A mobile body that is human-powered includes three all-directional wheels with axles thereof displaced from each other by 120 degrees, a connection portion that connects two front wheels, a brake attached to a rear wheel, and a disconnection portion that disconnects the two front wheels from each other. The connection portion connects the two front wheels such that the two front wheels rotate in directions opposite to each other. The connection portion connects the front wheels with the rear wheel such that the two front wheels rotate in the same direction, while the front wheels rotate in a direction opposite to a rotational direction of the rear wheel.

6 Claims, 8 Drawing Sheets

(56) References Cited

U.S. PATENT DOCUMENTS

| | | | | |
|---|---|---|---|---|
| 6,561,591 | B2* | 5/2003 | Zimet | B60B 33/08 |
| | | | | 301/5.1 |
| 6,668,950 | B2* | 12/2003 | Park | B60B 19/003 |
| | | | | 254/10 R |
| 8,556,279 | B2* | 10/2013 | McKinnon | B60B 33/0039 |
| | | | | 414/490 |
| 9,187,106 | B2* | 11/2015 | Khodor | B62B 5/067 |
| 10,245,945 | B2* | 4/2019 | Xiong | B60B 19/003 |
| 11,130,519 | B1* | 9/2021 | Cui | B66F 9/07568 |
| 11,492,028 | B1* | 11/2022 | Watts | B62B 3/001 |
| 2009/0200773 | A1* | 8/2009 | Riddiford | B62B 5/0466 |
| | | | | 280/47.24 |
| 2019/0300035 | A1* | 10/2019 | Colton | B60B 33/08 |

OTHER PUBLICATIONS

Kenjiro Tadakuma et al., *Development of Holonomic Omnidirectional Vehicle with "Omni-Ball": Spherical Wheels*, Proceedings of the 2007 IEEE/RSJ International Conference on Intelligent Robots and Systems, Oct. 29, 2007, pp. 33-39.

\* cited by examiner

MOVING BODY

TECHNICAL FIELD

The present invention relates to a technique for a mobile body with all-directional wheels that can move in any two-dimensional direction.

BACKGROUND ART

A mobile body with omnidirectional wheels has been commonly known (for example, Non-Patent Literatures 1 and 2). The omnidirectional wheel is an all-directional wheel including a roller around the outer ring of the wheel, the roller rotating in a direction perpendicular to the circumferential direction of the wheel. The omnidirectional wheel can move in any two-dimensional direction. A mobile body with the omnidirectional wheels can move in a translational manner, move diagonally, and rotate about itself, and is thus capable of freely moving around on the two-dimensional plane without making a three-point turn.

CITATION LIST

Non-Patent Literature

Non-Patent Literature 1: DAISUKE CHUGO, KUNIAKI KAWABATA, HAYATO KAETSU, HAJIME ASAMA, and TAKETOSHI MISHIMA, "Development of a control system for an omni-directional vehicle with step-climbing ability," Advanced Robotics, Vol. 19, No. 1, pp. 55-71 (2005).

Non-Patent Literature 2: Kenjiro Tadakuma, Riichiro Tadakuma, Jose Berengeres, "Development of Holonomic Omnidirectional Vehicle with "Omni-Ball": Spherical Wheels," Proceedings of the 2007 IEEE/RSJ International Conference on Intelligent Robots and Systems, TuA2.1, San Diego, CA, USA, Oct. 29-Nov. 2, 2007.

SUMMARY OF THE INVENTION

Technical Problem

Many of the mobile bodies as described above are electrically powered, utilizing a driving force of a motor. The movement speed and movement direction of the mobile body are controlled by the motor. When a high-capacitance battery is installed in a mobile body to provide power required for driving the motor, this increases the weight of the mobile body. There is thus a problem of the increase in weight inhibiting the smooth and rapid movement of the mobile body. In a case where a mobile body is driven for a long time, the mobile body needs to be installed with a relatively higher-capacitance battery, or needs to have a self-power generation function. This results in an increase in the size and weight of the mobile body. In view of the above, a human-powered mobile body without a motor is superior for avoiding the above problems.

However, a problem of a human-powered mobile body is that since the omnidirectional wheels have a high degree of freedom, this makes it difficult to move the human-powered mobile body toward an intended position through an intended path. Particularly, in a case where a mobile body equipped with a measurement device carries out mobile measurement while obtaining position information and measurement data, the mobile body is required to move smoothly and rapidly through an intended path. For example, when moving in a narrow area and over a long and narrow area, the mobile body is required to move straightly without hitting an obstruction.

The present invention has been achieved to solve the above problems, and it is an object of the present invention to provide a mobile body that is human-powered and capable of moving linearly.

Means for Solving the Problem

A mobile body according to the present invention includes: a first all-directional wheel, a second all-directional wheel, and a third all-directional wheel with axles of the first, second, and third all-directional wheels displaced from each other by 120 degrees; a connection portion that connects the first all-directional wheel and the second all-directional wheel; a brake attached to the third all-directional wheel; and a disconnection portion that disconnects the first all-directional wheel and the second all-directional wheel from each other, wherein the connection portion connects the first all-directional wheel and the second all-directional wheel, such that the first all-directional wheel and the second all-directional wheel rotate in directions opposite to each other when viewed from an axle side.

Effects of the Invention

According to the present invention, a mobile body that is human-powered and capable of moving linearly can be provided.

DESCRIPTION OF EMBODIMENT

An embodiment of the present invention will be described hereinafter with reference to the drawings.

Figure 1:
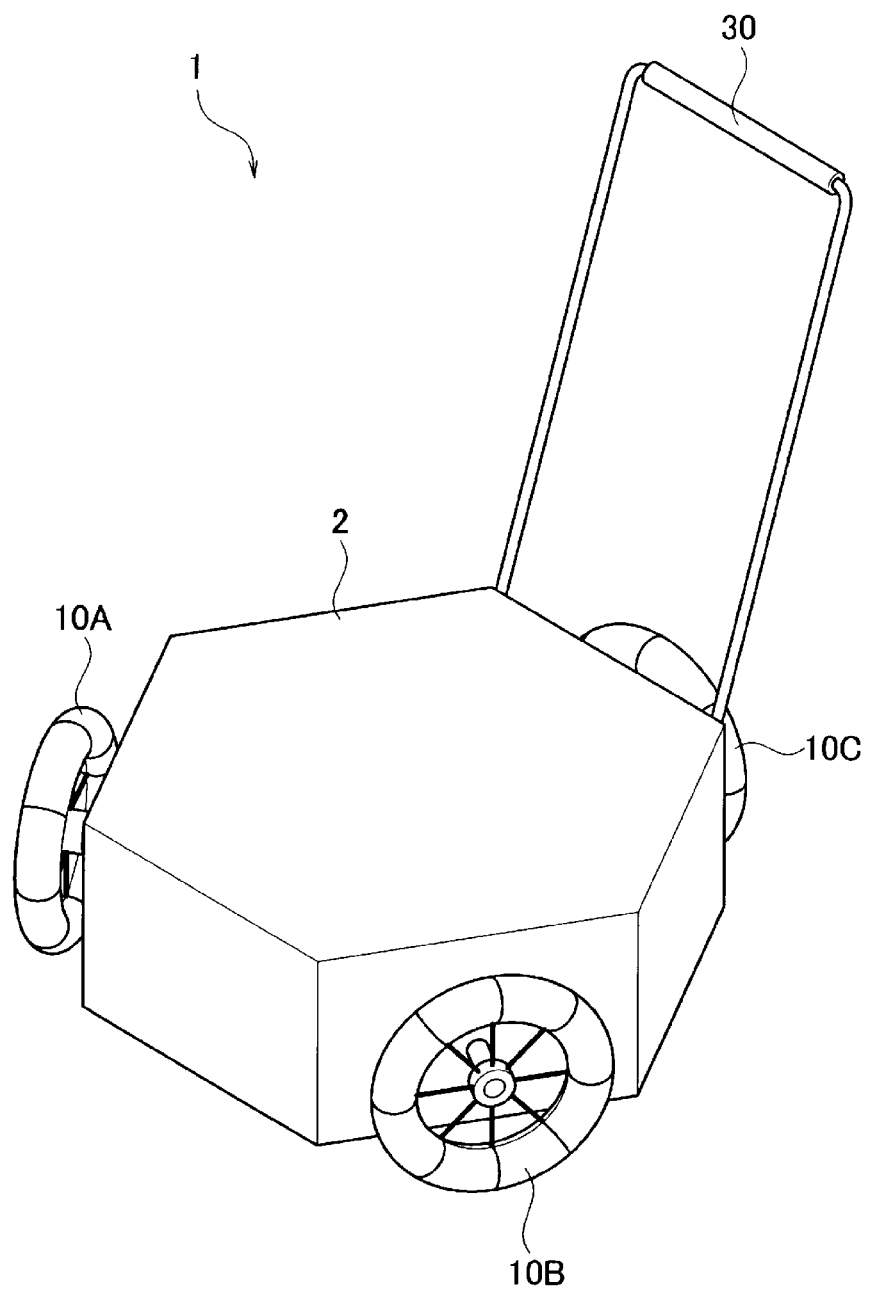
FIG. 1 is a schematic view of a mobile body according to an embodiment of the present invention.

FIG. 1 is a schematic view of a mobile body according to the present embodiment. A mobile body 1 illustrated in FIG.

1 includes three omnidirectional wheels 10A to 10C having the same size, a housing 20, and a handlebar 30.

Each of the omnidirectional wheels 10A to 10C includes a roller that freely rotates on the circumference of the wheel connected to an axle. Each of the omnidirectional wheels 10A to 10C can move in a rotational direction of the roller in addition to a rotational direction of the wheel. The mobile body 1 includes the omnidirectional wheels 10A to 10C, so that the mobile body 1 can be moved freely on the two-dimensional plane without changing the orientation of the mobile body 1. In FIG. 1, the mobile body 1 includes the omnidirectional wheels 10A to 10C on the outer periphery of the housing 20. However, the mobile body 1 may include the omnidirectional wheels 10A to 10C in the housing 20.

Various types of measurement devices are accommodated in the housing 20. Examples of the measurement devices include an acceleration sensor, a gyroscope sensor, a camera that captures an image of a road surface, and an underground radar that outputs radio waves to the ground and detects reflected waves to search for an object buried underground. While in FIG. 1, the housing 20 has a hexagonal prism shape, the shape of the housing 20 is not limited thereto. The housing 20 may have a columnar shape or a cuboid shape.

A user operates the handlebar 30 to move the mobile body 1 in the two-dimensional planar direction to obtain information on the position of the mobile body and measurement data. The handlebar 30 may have any shape as long as a user can manually move the mobile body 1.

Next, the positioning of the omnidirectional wheels 10A to 10C is described.

Figure 2:
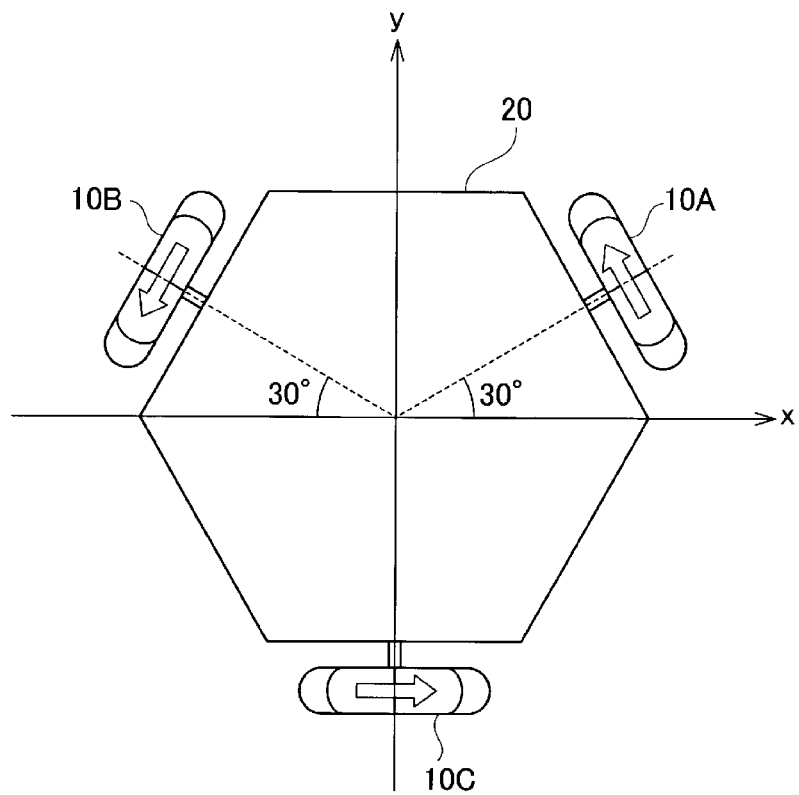
FIG. 2 is a top view of the mobile body for describing the positioning of omnidirectional wheels.

As illustrated in FIG. 2, the three omnidirectional wheels 10A to 10C are positioned beside the housing 20 such that the respective circumferential directions of the wheels are displaced from each other by 60 degrees. In FIG. 2, the intersection of the lines extending from the axles (rotary shafts) of the omnidirectional wheels 10A to 10C is defined as the point of origin, and then the positive direction on the Y-axis is defined as forward, the positive direction on the X-axis is defined as rightward, and the negative direction on the X-axis is defined as leftward. The axle of the omnidirectional wheel 10C extends parallel to the Y-axis. The circumferential direction of the omnidirectional wheel 10C is parallel to the X-axis. The axles of the omnidirectional wheels 10A and 10B are inclined toward the positive direction on the Y-axis relative to the X-axis, and form an angle of 30 degrees between each of the axles and the X-axis. The axles of the three omnidirectional wheels 10A to 10C are displaced from each other by 120 degrees. The omnidirectional wheels 10A to 10C are positioned in such a manner that the line extending from the center of each of the omnidirectional wheels 10A to 10C reaches the vertex of an equilateral triangle. Hereinafter, two of the wheels, the omnidirectional wheels 10A and 10B, are sometimes referred to as "front wheels 10A and 10B," while the omnidirectional wheel 10C is sometimes referred to as "rear wheel 10C." The direction in which the omnidirectional wheels 10A to 10C rotate counterclockwise when viewed from the axle side (from the housing 20) is defined as a forward-rotation direction. The direction in which the omnidirectional wheels 10A to 10C rotate clockwise when viewed from the axle side (from the housing 20) is defined as a reverse-rotation direction. The rotational direction indicated by the arrow in FIG. 2 is the forward-rotation direction, while the rotational direction opposite to the arrow is the reverse-rotation direction.

When the front wheel 10A is rotated in the forward-rotation direction, the front wheel 10B is rotated in the reverse-rotation direction, and the rear wheel 10C is prevented from rotating in the circumferential direction, then the mobile body 1 moves forward. When the front wheel 10A is rotated in the reverse-rotation direction, the front wheel 10B is rotated in the forward-rotation direction, and the rear wheel 10C is prevented from rotating in the circumferential direction, then the mobile body 1 moves backward. When the front wheels 10A and 10B are rotated in the reverse-rotation direction, and the rear wheel 10C is rotated in the forward-rotation direction, then the mobile body 1 moves in the positive direction on the X-axis. When the front wheels 10A and 10B are rotated in the forward-rotation direction, and the rear wheel 10C is rotated in the reverse-rotation direction, then the mobile body 1 moves in the negative direction on the X-axis. When the omnidirectional wheels 10A to 10C are all rotated in the forward-rotation direction at the same velocity, then the mobile body 1 rotates about itself in place.

By operating the handlebar 30, a user can move the mobile body 1 easily in the forward-rearward direction, the rightward-leftward direction, and the diagonal direction. However, it is difficult to accurately move the mobile body 1 linearly in a stable manner by human power. Thus, in the present embodiment, the front wheels 10A and 10B are connected, while the rear wheel 10C is prevented from rotating in the circumferential direction, or the front wheels 10A and 10B are connected with the rear wheel 10C, to facilitate the linear movement of the mobile body 1 in the forward-rearward direction and the lateral direction.

Forward-Rearward Movement

Figure 3:
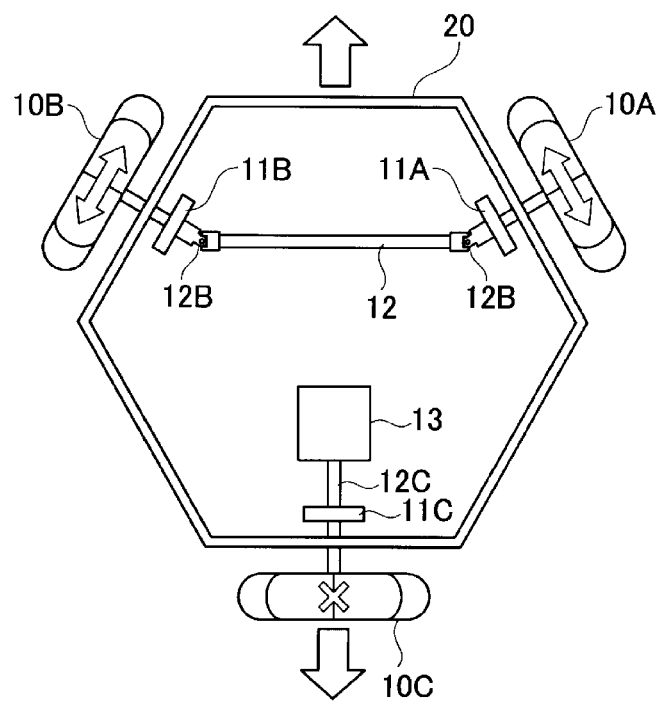
FIG. 3 illustrates a working example in which the movement direction of the mobile body is limited to only a forward-rearward direction.

With reference to FIG. 3, a working example is described in which the mobile body 1 is limited to moving only in the forward-rearward direction.

In the working example in FIG. 3, a connection mechanism that connects the front wheels, and a brake mechanism that prevents the rear wheel from rotating in the circumferential direction are introduced. Specifically, axles 12A and 12B of the front wheels 10A and 10B are connected by a connection portion 12 through a universal joint. The front wheels 10A and 10B are connected by the connection portion 12, so that when a user operates the handlebar 30 to externally apply a force to the mobile body 1, the front wheels 10A and 10B rotate at the same velocity in directions opposite to each other (one rotates in the forward-rotation direction, while the other rotates in the reverse-rotation direction). A brake 13 is attached to an axle 12C of the rear wheel 10C to prevent the axle 12C from rotating. When the brake is applied to the rear wheel 10C, the rear wheel 10C is prevented from rotating in the circumferential direction, and only the roller on the circumference of the rear wheel 10C rotates. For example, a bearing holder with a brake or an electromagnetic brake can be used as the brake 13.

The front wheels 10A and 10B are connected such that the front wheels 10A and 10B rotate at the same velocity in directions opposite to each other, and also the brake is applied to the rear wheel 10C. This can limit the movement direction of the mobile body 1 to only the forward-rearward direction against an external force applied from any direction.

Encoders 11A to 11C are attached respectively to the axles 12A to 12C of the omnidirectional wheels 10A to 10C. Each of the encoders 11A to 11C measures the rotational amount of each of the axles 12A to 12C. Based on the rotational amount of each of the axles 12A to 12C, a movement direction, a movement distance, a movement velocity vector, and a rotating vector are calculated to obtain the position to which the mobile body 1 has moved.

Figure 4:
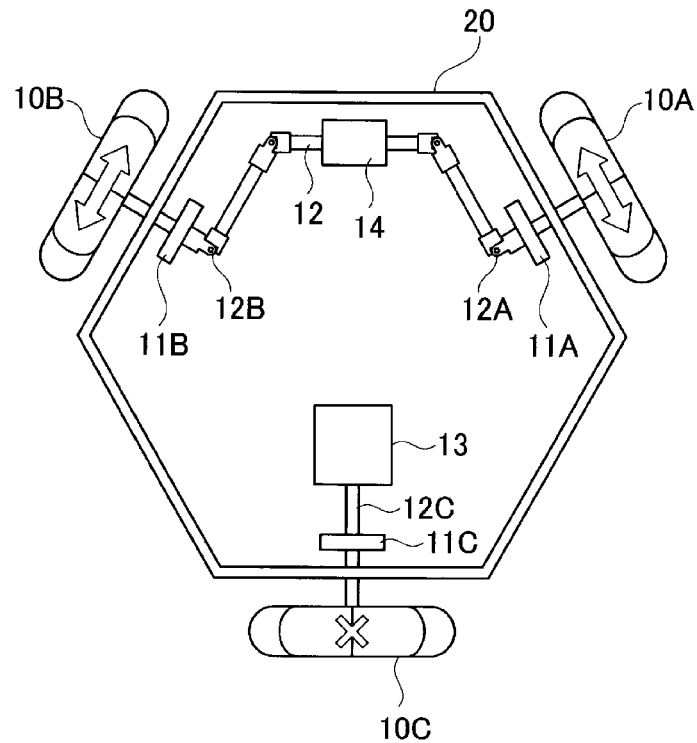
FIG. 4 illustrates a working example in which an engagement/disengagement mechanism that can disconnect front wheels from each other is provided.

With reference to FIG. 4, a working example is described in which the front wheels can be disconnected.

In the working example in FIG. 4, the connection mechanism is provided with an engagement/disengagement mechanism that can disconnect the front wheels. Specifically, an engagement/disengagement mechanism 14 that can disconnect the axles 12A and 12B from each other is attached to the connection portion 12 of the axles 12A and 12B. The engagement/disengagement mechanism 14 can control the axles 12A and 12B to be brought into a connected state or a disconnected state. As the engagement/disengagement mechanism 14, a coupling, a gear, or an electromagnetic clutch can be used. When the axles 12A and 12B are connected with each other by the engagement/disengagement mechanism 14, the front wheels 10A and 10B rotate in conjunction with each other in the same manner as in the working example in FIG. 3. When the axles 12A and 12B are disconnected from each other by the engagement/disengagement mechanism 14, the front wheels 10A and 10B move freely and independently from each other. At this time, the brake 13 is released to allow the rear wheel 10C to move freely. Then, the mobile body 1 can move freely on the two-dimensional plane without being limited to a particular movement direction.

Figure 5:
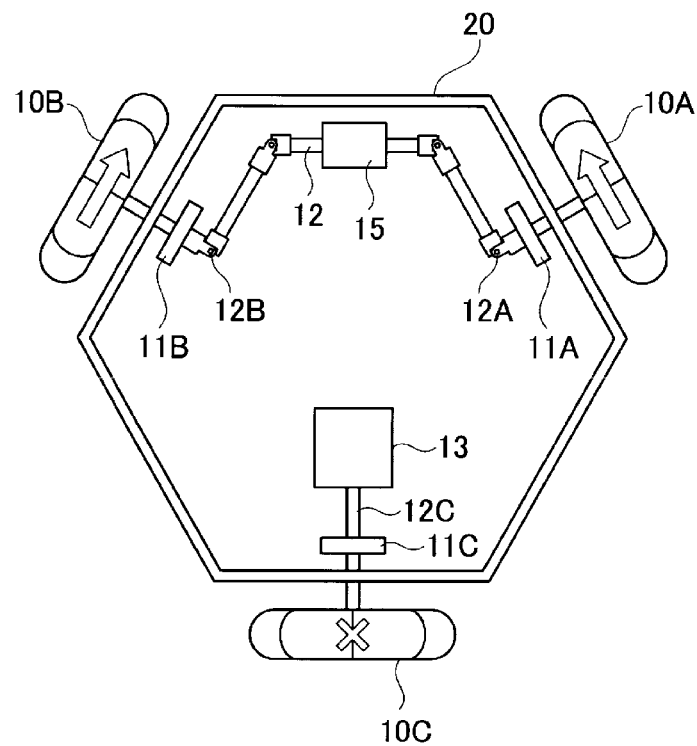
FIG. 5 illustrates a working example in which a connection mechanism is provided with a ratchet mechanism that can control the rotational direction of the front wheels.

With reference to FIG. 5, a working example is described in which the rotational direction of the front wheels can be controlled.

In the working example in FIG. 5, the connection mechanism is provided with a ratchet mechanism that can control the rotational direction of the front wheels. The connection portion 12 of the axles 12A and 12B is provided with a ratchet mechanism 15 to limit the rotational direction of the axles 12A and 12B to only one direction. As a result of this, the mobile body 1 can be limited to only a forward movement or a backward movement. In the working example in FIG. 4, the ratchet mechanism may be provided.

The ratchet mechanism 15 is provided to limit the rotational direction of the front wheels 10A and 10B to only one direction, so that for example, when a user operates the mobile body 1 on a slope, the ratchet mechanism 15 can prevent the mobile body 1 from rolling down the slope.

Lateral Movement

Figure 6:
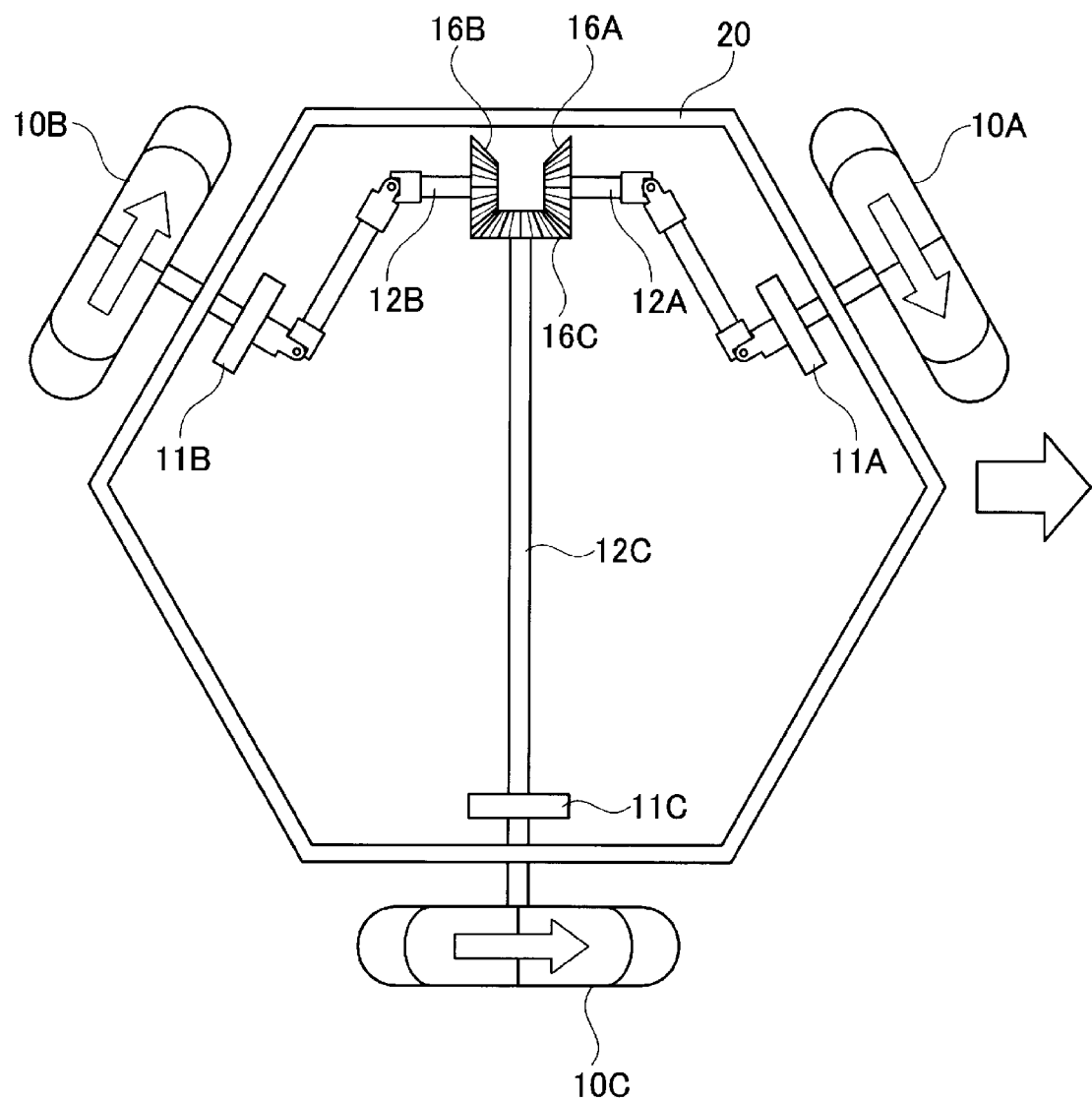
FIG. 6 illustrates a working example in which the movement direction of the mobile body is limited to only a lateral direction.

With reference to FIG. 6, a working example is described in which the mobile body 1 is limited to moving only in the lateral direction.

In order to move the mobile body 1 in the lateral direction (rightward-leftward direction), it is necessary that rotational velocities V1 and V2 of the right and left front wheels in the circumferential direction are equal to each other, while the rotational directions of these front wheels correspond with each other, and a rotational velocity V3 of the rear wheel in the circumferential direction is twice as fast as the rotational velocities V1 and V2 of the front wheels, while the rotational direction of the rear wheel is opposite to the rotational direction of the front wheels. The description "the rotational directions of the right and left front wheels correspond with each other" means that both the right and left front wheels rotate in either the forward-rotation direction or the reverse-rotation direction. The description "the rotational direction of the rear wheel is opposite to the rotational direction of the front wheels" means that when the front wheels rotate in the forward-rotation direction, the rear wheel rotates in the reverse-rotation direction, or when the front wheels rotate in the reverse-rotation direction, the rear wheel rotates in the forward-rotation direction. That is, in order to move the mobile body 1 in a perfectly lateral direction, it is necessary to satisfy the condition that the ratio of the rotational velocity V1:V2:V3 between two front wheels and a rear wheel is 1:1:−2.

In the working example in FIG. 6, bevel gears 16A to 16C are attached respectively to the axles 12A to 12C of the omnidirectional wheels 10A to 10C to engage the bevel gears 16A and 16B with the bevel gear 16C in such a manner that the front wheels 10A an 10B rotate in a direction opposite to the rotational direction of the rear wheel 10C, so that the omnidirectional wheels 10A to 10C are operated in conjunction with each other. Note that the gear ratio between the bevel gears 16A to 16C is set to 2:2:1 such that the ratio of the rotational velocity between the omnidirectional wheels 10A to 10C is 1:1:−2.

The connection portion that connects the axles 12A to 12C is not limited to the bevel gears 16A to 16C. Any connection portion may be employed as long as the connection portion allows the omnidirectional wheels 10A to 10C to operate in conjunction with each other such that the ratio of the rotational velocity between the omnidirectional wheels 10A to 10C is 1:1:−2. A plurality of gears may be combined to adjust the rotational velocities and the rotational directions of the omnidirectional wheels 10A to 10C.

The front wheels 10A and 10B are connected with the rear wheel 10C such that the ratio of the rotational velocity between the front wheels 10A and 10B and the rear wheel 10C is 1:1:−2. This can limit the movement direction of the mobile body 1 to only the lateral direction against an external force applied from any direction.

Switch Between Movement Modes

Figure 7:
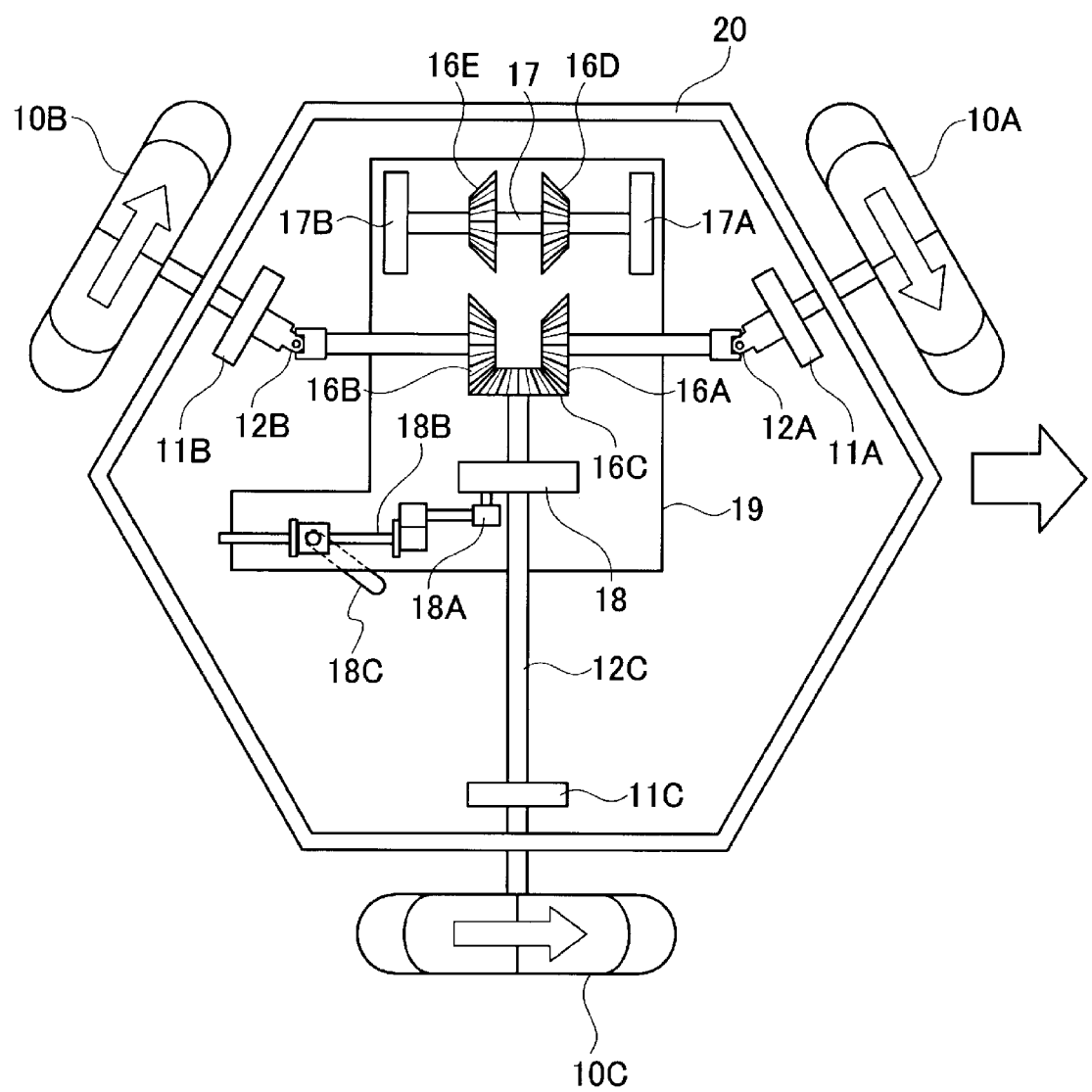
FIG. 7 illustrates a connection state when the mobile body whose movement mode is switchable is in a lateral movement mode.
Figure 8:
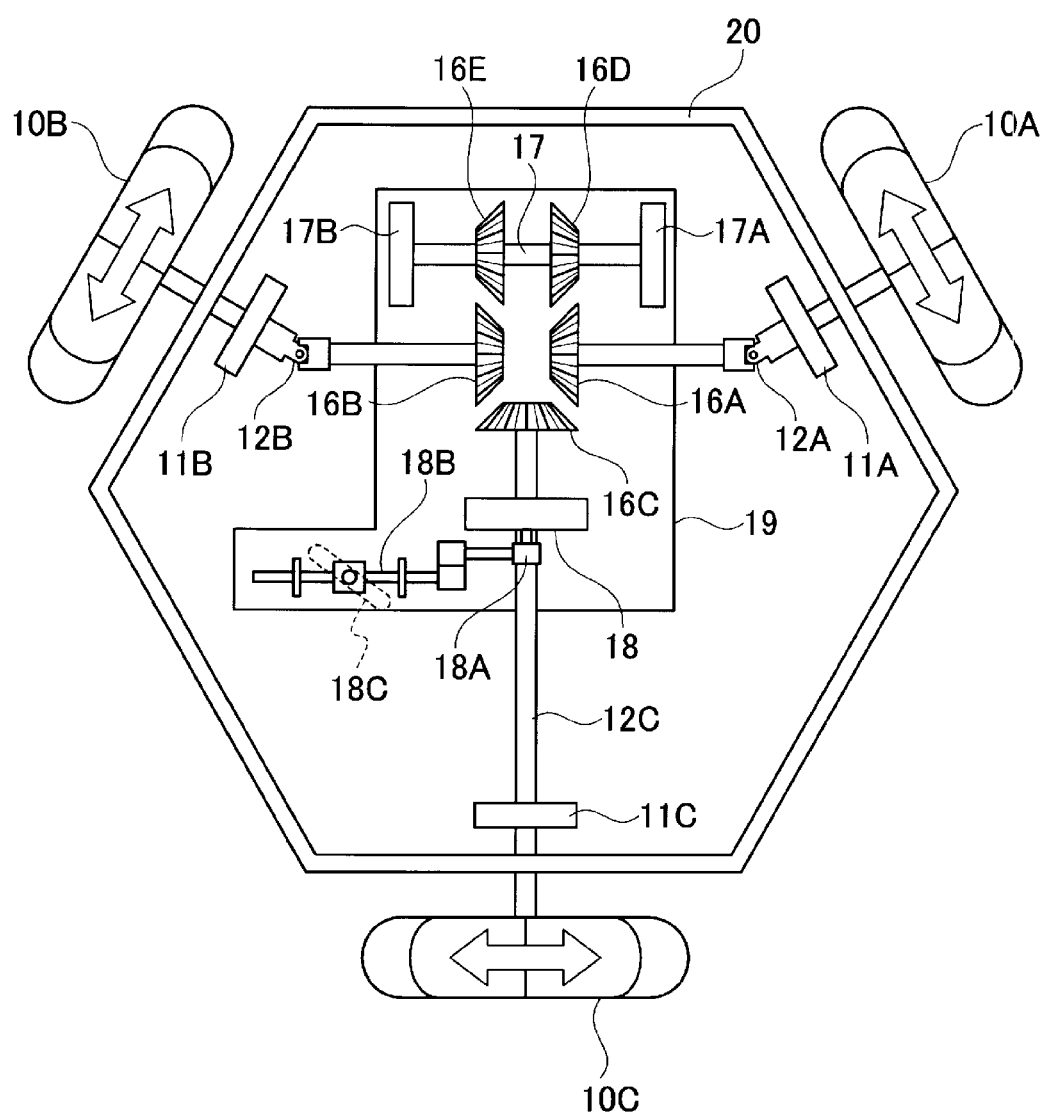
FIG. 8 illustrates a connection state when the mobile body whose movement mode is switchable is in a free movement mode.
Figure 9:
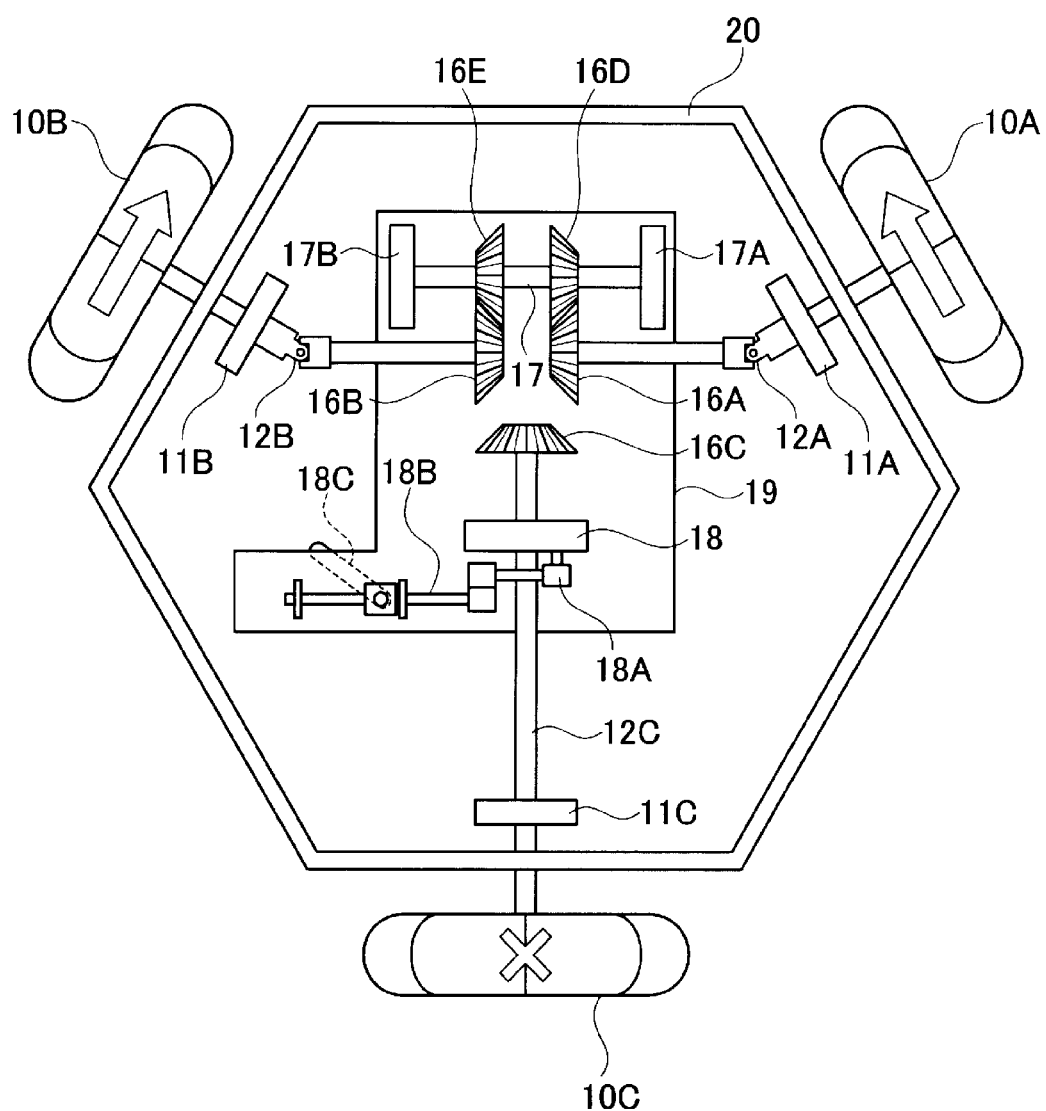
FIG. 9 illustrates a connection state when the mobile body whose movement mode is switchable is in a forward-rearward movement mode.

With reference to FIGS. 7 to 9, a working example is described in which the movement mode of the mobile body 1 is switchable to any of a lateral movement mode, a free movement mode, and a forward-rearward movement mode. FIG. 7 illustrates a connection state when the mobile body 1 is in the lateral movement mode. FIG. 8 illustrates a connection state when the mobile body 1 is in the free movement mode. FIG. 9 illustrates a connection state when the mobile body 1 is in the forward-rearward movement mode.

The lateral movement mode is a mode in which the front wheels and the rear wheel are operated in conjunction with each other to limit the movement direction of the mobile body 1 to only the lateral direction. The free movement mode is a mode in which two front wheels and a rear wheel can all move freely without limiting the movement direction of the mobile body 1. The forward-rearward movement mode is a mode in which the front wheels are connected with each other, while the brake is applied to the rear wheel to limit the movement direction of the mobile body 1 to only the forward-rearward direction.

The bevel gears 16A and 16B are attached respectively to the axles 12A and 12B of the front wheels 10A and 10B. The bevel gear 16C is attached to the axle 12C of the rear wheel 10C. The gear ratio between the bevel gears 16A to 16C is set to 2:2:1.

The mobile body 1 includes a frame 19 that is movable forward and rearward. A pair of bearing holders 17A and 17B, and a bearing holder 18 with a brake are fixed to the frame 19.

The bearing holders 17A and 17B hold a rotary shaft 17. Bevel gears 16D and 16E are fixed to the rotary shaft 17 at positions where the bevel gears 16D and 16E are engageable respectively with the bevel gears 16A and 16B. The rotary shaft 17 and the bevel gears 16D and 16E serve as a connection portion that connects the front wheels 10A and 10B such that the front wheels 10A and 10B rotate in directions opposite to each other.

The bearing holder 18 with a brake holds the axle 12C. The bearing holder 18 with a brake includes a brake lever 18A used for operating the brake. When the brake lever 18A is tilted toward the rightward direction on the top in FIG. 7, the bearing holder 18 increases its force to hold the axle 12C to stop the axle 12C from rotating. The brake lever 18A is connected to an arm 18B. The arm 18B is held in a movable manner in a groove 18 provided on the housing 20. As the frame 19 moves, the arm 18B moves in the right-downward direction from the state in FIG. 7 to the state in FIG. 9. In the state in FIG. 9, the arm 18B moves to a position where the brake lever 18A is tilted toward the rightward direction.

The frame 19 is movable forward and rearward by a switch lever (not illustrated). More specifically, the position of the frame 19 can be set by the switch lever to one of the three positions, foremost, middle, and rearmost. As the frame 19 moves, the position of the bevel gear 16C and the positions of the bevel gears 16D and 16E are changed.

As illustrated in FIG. 7, when the frame 19 is moved to the foremost position, the bevel gear 16C engages with the bevel gears 16A and 16B. The front wheels 10A and 10B, and the rear wheel 10C rotate in conjunction with each other such that the ratio of the rotational velocity between the front wheels 10A and 10B and the rear wheel 10C is 1:1:−2. In the connection state in FIG. 7, the movement direction of the mobile body 1 is limited to only the lateral direction as described in the working example in FIG. 6. Note that the brake is not applied in the state in FIG. 7 since the brake lever 18A is not tilted toward the rightward direction.

As illustrated in FIG. 8, when the frame 19 is moved to a position slightly rearward from the state in FIG. 7, the bevel gear 16C moves to a position rearward from the position in FIG. 7, and consequently the bevel gears 16A to 16C do not engage with each other at all. In the state in FIG. 8, the brake is not applied since the brake lever 18A is not tilted toward the rightward direction. The front wheels 10A and 10B and the rear wheel 10C can all move freely without operating in conjunction with each other.

As illustrated in FIG. 9, when the frame 19 is moved to a position further rearward from the state in FIG. 8, the bevel gears 16D and 16E engage with the bevel gears 16A and 16B, respectively. The axles 12A and 12B are connected through the rotary shaft 17. The front wheels 10A and 10B rotate at the same velocity in directions opposite to each other.

The frame 19 has moved in the rearward direction, so that the brake lever 18A is tilted toward the rightward direction to prevent the axle 12C from rotating and thus apply the brake to the rear wheel 10C. In the connection state in FIG. 9, the movement direction of the mobile body 1 is limited to only the forward-rearward direction as described in the working example in FIG. 3.

When the ratchet mechanism is attached to either of the axles 12A and 12B of the front wheels 10A and 10B, the movement direction of the mobile body 1 can be limited to the forward direction or the rearward direction as described in the working example in FIG. 5. The bearing holders 17A and 17B that hold the rotary shaft 17 may include the ratchet mechanism.

Next, a search for an object buried underground by using the mobile body 1 according to the present embodiment is described.

Figure 10:
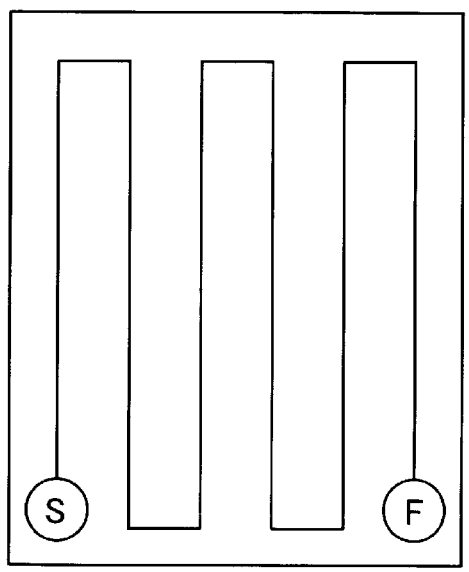
FIG. 10 illustrates an example of a movement path of the mobile body according to the present embodiment.

In a case where a mobile body is installed with an underground radar to scan a measurement area, when the mobile body according to the present embodiment is used, the measurement area can be scanned efficiently without waste since the mobile body 1 can be moved in a straight line as illustrated in FIG. 10. In addition, the mobile body 1 according to the present embodiment can also minimize an error in estimation of the position (movement distance) of the mobile body 1.

For example, a search for an object buried underground by using the mobile body 1 in FIG. 4 is described. A user searches for an object buried underground while moving the mobile body 1 in an immediately upward direction from a start point S in FIG. 10. When the mobile body 1 has reached the edge of the measurement area, the user uses the engagement/disengagement mechanism 14 to disconnect the axles 12A and 12B from each other to rotate the mobile body 1 in place in the rightward direction. After having rotated the mobile body 1 rightward by 90 degrees, the user uses the engagement/disengagement mechanism 14 to connect the axles 12A and 12B with each other to move the mobile body 1 in the rightward direction. When the mobile body 1 has reached the next search line, the user uses the engagement/disengagement mechanism 14 to disconnect the axles 12A and 12B from each other to rotate the mobile body 1 in place in the rightward direction. After having rotated the mobile body 1 rightward by 90 degrees, the user uses the engagement/disengagement mechanism 14 to connect the axles 12A and 12B with each other. While moving the mobile body 1 in an immediately downward direction, the user searches for an object buried underground. The user repeats the operations described above to search for an object buried underground from the start point S to a finish point F by using the mobile body 1.

A search for an object buried underground by using the mobile body 1 in FIGS. 7 to 9 is described. A user sets the mobile body 1 to the forward-rearward movement mode in FIG. 9 to search for an object buried underground while moving the mobile body 1 in an immediately upward direction from the start point S in FIG. 10. When the mobile body 1 has reached the edge of the measurement area, the user switches the mobile body 1 to the lateral movement mode in FIG. 7 to laterally move the mobile body 1 in the rightward direction. When the mobile body 1 reaches the next search line, the user switches the mobile body 1 to the forward-rearward movement mode in FIG. 9 to search for an object buried underground while moving the mobile body 1 in an immediately downward direction. The user repeats the operations described above to search for an object buried underground from the start point S to the finish point F by using the mobile body 1.

Use of the mobile body 1 in FIGS. 7 to 9 ensures that the movement of the mobile body 1 in the forward-rearward direction is perpendicular to the movement of the mobile body 1 in the lateral direction. Thus, measurement lines in a two-dimensional grid can be easily achieved with all of the measurement lines in parallel with each other.

Figure 11:
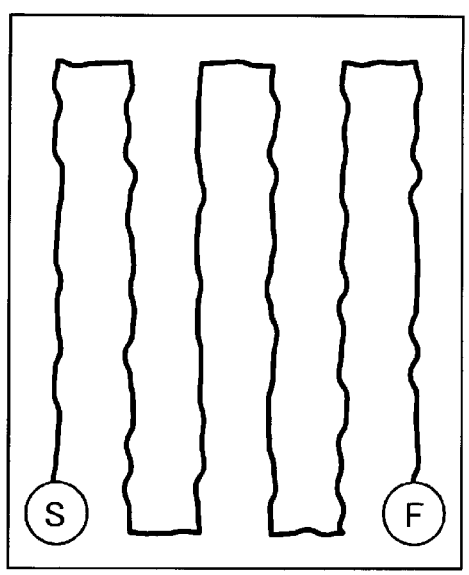
FIG. 11 illustrates an example of a movement path of a conventional mobile body.

Note that, unlike the present embodiment, in a case where the movement direction of a mobile body cannot be limited to the forward-rearward direction or the lateral direction, the mobile body cannot be moved linearly as illustrated in FIG. 11 and it is thus difficult to maintain the measurement lines in a uniform state. For this reason, since the mobile body cannot completely cover the measurement area in its entirety, or an error in estimation of the position increases, it is difficult to obtain precise two-dimensional measurement data.

As described above, according to the present embodiment, in the mobile body 1 that is human-powered, the front wheels 10A and 10B are connected and the brake is applied to the rear wheel 10C. This can limit the movement direction of the mobile body 1 to only the forward-rearward direction. The front wheels 10A and 10B are connected with the rear wheel 10C such that the front wheels 10A and 10B rotate in a direction opposite to the rotational direction of the rear wheel 10C. This can limit the movement direction of the mobile body 1 to only the lateral direction. The movement direction of the mobile body 1 is limited so that a user can move the mobile body 1 linearly without attention. Since a load to be imposed on a user, which results from constraining the degree of freedom of the mobile body 1, is reduced, the user can move the mobile body 1 only in the constrained direction easily with less labor, while the smooth and rapid movement characteristics are maintained.

When the mobile body 1 can be accurately moved in a straight line during the mobile measurement, this can significantly improve the quality of measurement data. In addition, the measurement lines can be made in parallel with each other, thus two-dimensional mesh data can be accurately generated, and consequently measurement with less labor can be achieved.

REFERENCE SIGNS LIST

1 Mobile body
10A, 10B Front wheel (Omnidirectional wheel)
10C Rear wheel (Omnidirectional wheel)
11A to 11C Encoder
12 Connection portion
12A to 12C Axle
13 Brake
14 Engagement/disengagement mechanism
15 Ratchet mechanism
16A to 16E Bevel gear
17 Rotary shaft
17A, 17B Bearing holder
18 Bearing holder with brake
18A Brake lever
19 Frame
20 Housing
30 Handlebar

The invention claimed is:

1. A mobile body that is human-powered, the mobile body comprising:
a first all-directional wheel, a second all-directional wheel, and a third all-directional wheel with axles of the first, second, and third all-directional wheels displaced from each other by 120 degrees;
a connection portion that connects the first all-directional wheel and the second all-directional wheel;
a brake attached to the third all-directional wheel; and
a disconnection portion that disconnects the first all-directional wheel and the second all-directional wheel from each other, wherein
the connection portion connects the first all-directional wheel and the second all-directional wheel, such that the first all-directional wheel and the second all-directional wheel rotate in directions opposite to each other when viewed from an axle side.

2. The mobile body according to claim 1, wherein the connection portion connects the first all-directional wheel, the second all-directional wheel, and the third all-directional wheel, such that the first all-directional wheel rotates in a direction same as a rotational direction of the second all-directional wheel, while the first all-directional wheel rotates in a direction opposite to a rotational direction of the third all-directional wheel, when viewed from the axle side.

3. The mobile body according to claim 2, wherein the connection portion switches between a state in which the first all-directional wheel and the second all-directional wheel are connected, a state in which the first all-directional wheel, the second all-directional wheel, and the third all-directional wheel are connected, and a state in which the all-directional wheels are not connected with each other at all.

4. The mobile body according to claim 1, comprising a ratchet that limits a rotational direction of the first all-directional wheel and the second all-directional wheel.

5. The mobile body according to claim 2, comprising a ratchet that limits a rotational direction of the first all-directional wheel and the second all-directional wheel.

6. The mobile body according to claim 3, comprising a ratchet that limits a rotational direction of the first all-directional wheel and the second all-directional wheel.

* * * * *